United States Patent

[11] 3,540,643

[72] Inventor David Arthur Longland
Ascot, England
[21] Appl. No. 728,647
[22] Filed May 13, 1968
[45] Patented Nov. 17, 1970
[73] Assignee International Computers and Tabulators
Limited
Putney, London, England
a British company
[32] Priority May 16, 1967
[33] Great Britain
[31] 22,616/67

[54] THERMISTOR SENSING OF TAPE POSITION
4 Claims, 2 Drawing Figs.
[52] U.S. Cl. .................................................. 226/97,
226/100, 73/204
[51] Int. Cl. ...................................................... B65h 25/08
[50] Field of Search .......................................... 226/100,
97, 113, 118; 73/204

[56] References Cited
UNITED STATES PATENTS
3,085,431 4/1963 Yerman et al. ............... 73/204
3,425,277 2/1969 Adams ........................ 73/204
3,449,953 6/1969 Craft .......................... 73/204

Primary Examiner—Allen N. Knowles
Attorney—Hane and Baxley

ABSTRACT: In a tape handler system, tape loop position varies an air flow through a tape loop reservoir. The quantity of air flow is detected by a thermistor which provides an electrical output signal representative of tape loop position. The thermistor is employed in an electrical bridge arrangement while a power supply connected to the bridge is varied to maintain the resistance of the thermistor constant to balance the bridge. The magnitude of power required to effect such a balance provides an electrical indication of tape loop position.

Patented Nov. 17, 1970

3,540,643

INVENTOR
DAVID ARTHUR LONGLAND
BY Hame and Bayley
ATTORNEYS

3,540,643

THERMISTOR SENSING OF TAPE POSITION

BACKGROUND OF THE INVENTION

The subject invention relates to a position sensing system for sensing the position of a body, such as a tape loop in a tape handling machine.

In tape handling systems it is common to provide a loop of tape, which may be magnetic or of other material, in order to prevent damage to the entire tape during starting and stopping operations. Such a tape loop normally occurs between a capstan and a reel while the loop is stored in a reservoir of any desired configuration. Various systems and techniques for sensing the position of such tape loops in a reservoir are known, including those wherein a plurality of vacuum operated switches has been provided to sense tape loop position and to provide an electrical signal representative of such positions. Output position indicating signals have also been employed to operate a drive motor to adjust the tape loop to a desired or predetermined position, or length.

According to the present invention, a position sensing system is provided to sense the position of a body wherein a quantity of fluid flow is varied in dependence upon the position of the body. A thermistor is also provided for generating an electrical output signal in response to changes of the fluid flow and thereby electrically representing positions of the body. More particularly, the invention contemplates a position indicating system for tape handling apparatus wherein a fluid flow varies in response to changes in position of a tape loop segment stored in an open-ended reservoir. Also, the above noted fluid flow responsive thermistor is preferably employed as one arm of an electrical bridge while the electrical power supply associated with such bridge is varied to maintain the thermistor at a constant resistance, thereby balancing the bridge. Thus, the magnitude of electrical power required to balance the bridge provides an indication of tape loop position.

Further, the present system employs a suction unit to produce a fluid flow through the open-ended tape loop storage reservoir with the suction unit connected to the reservoir by appropriate tubing and channels. A plurality of spaced apertures are provided in a particular channel thereby allowing fluid flow through the reservoir. The tape loop operates as a barrier to the suction unit produced fluid flow such that a varying number of apertures are exposed to the atmosphere while the remainder are exposed to the suction and a duct containing the sensing thermistor in dependence upon tape loop position. Therefore, the total fluid flow to the sensing thermistor depends on the number of apertures so exposed by the tape loop with such fluid flow providing a direct representation of tape loop position.

BRIEF DESCRIPTION OF THE DRAWINGS

One embodiment of the invention will now be described with reference to the accompanying drawing, in which:

Referring now to FIG. 1 of the drawing, a tape handling machine includes a pair of capstans 1 and 2, arranged to drive a magnetic tape 3 backwards or forwards past a head assembly 4. Either one of two pinch rollers 5 and 6 may be moved electromagnetically to press the tape 3 against the corresponding capstan 1 or 2, respectively, to cause the required forward or backward movement of the tape.

Figure 1:
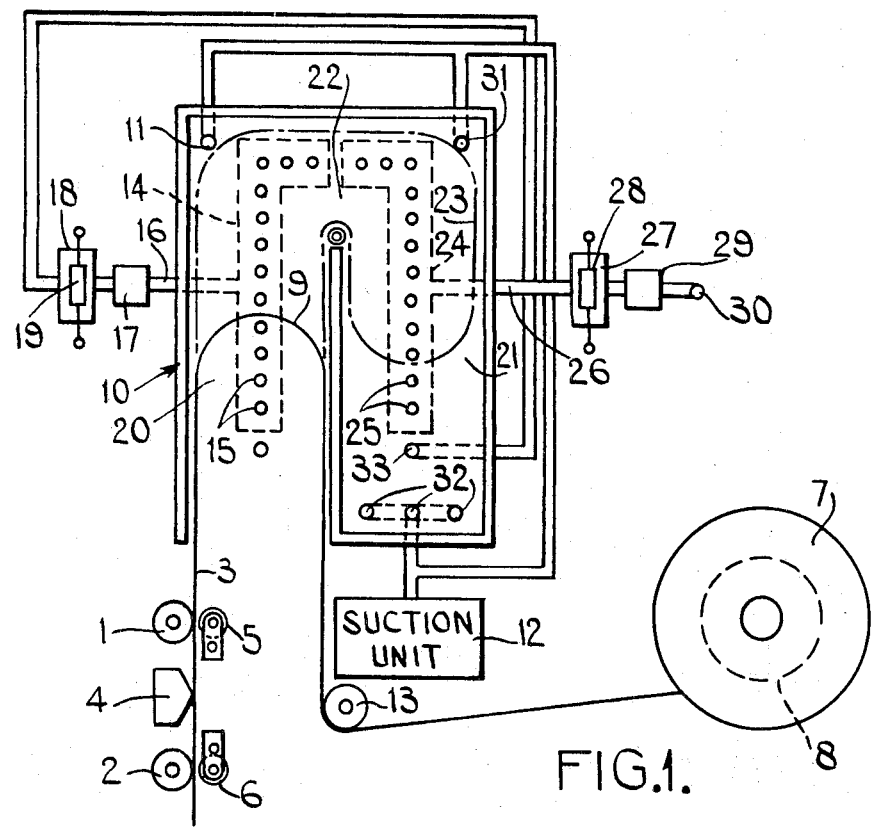
FIG. 1 shows a schematic view of part of a magnetic tape handling machine including a thermistor tape position sensing and fluid flow producing apparatus.

When forward or backward drive is suddenly applied to the tape 3, the tape 3 accelerates very rapidly. The tape 3 is contained on a reel 7, which together with its drive motor 8 has a relatively large inertia and so cannot accelerate as rapidly as the tape 3. Hence stretching or breaking of the tape 3 could occur if it were not for a loop 9 of the tape 3, formed in an open-ended reservoir 10. The loop 9 is formed by a slack length of the tape 3 between the reel 7 and the capstan 1, which length is drawn into the reservoir 10 by suction applied to a vent 11 by a suction unit 12. When drive is now applied to the tape 3, the reel 7 cannot unwind or wind up the tape 3 instantaneously, but nevertheless the tape at the capstan 1 or 2 can move immediately without damage, the size of the loop 9 merely being changed.

The reel 7 is driven by the motor 8 in the required direction to restore the tape loop 9 to its former position in the reservoir 10. The operation of the motor 8 is controlled by position sensing apparatus which senses the position of the loop 9 within the reservoir 10 and causes the necessary power to be supplied to the motor 8 to keep the loop 9 at the desired position.

The end of the tape 3 opposite to the reel 7 is wound on to a further reel (not shown) and preferably passes into a second reservoir (not shown) between the capstan 2 and the said further reel. An idler pulley 13 is provided to guide the tape 3 from the reel 7 into the reservoir 10.

The position sensing apparatus includes a channel 14 which extends behind the reservoir 10. A series of apertures 15 lying along the direction of possible extension of the loop 9 communicate between the channel 14 and the inside of the reservoir 10. A tube 16 connects the channel 14 to an air filter 17 and thence to a chamber 18 containing a thermistor 19. The chamber 18 is also connected indirectly to the suction unit 12 in a manner which will be described later.

The reservoir 10 could be a single rectangular compartment 20 with a single channel 14 and a single filter 17, chamber 18 and thermistor 19 associated therewith. However, in the preferred embodiment the effective length of the reservoir 10 is increased by providing a second rectangular compartment 21 alongside the compartment 20. The compartment 21 is closed at both ends, but communicates with the compartment 20 through a gap 22 in a wall separating the compartments 20 and 21. The loop 9 may take up a position such as that indicated by a chain dotted line 23 by extending through the gap 22.

A second channel 24 communicates with the compartment 21 through apertures 25, and is connected via a tube 26 to a second chamber 27 containing a second thermistor 28. The chamber 27 is also connected to an air filter 29 which is open to the atmosphere through a vent 30.

Suction is applied to vents 31 and 32 at opposite ends of the compartment 21 by the suction unit 12. An aperture 33, which is positioned to correspond with the maximum permissible length of loop 9, is connected to the chamber 18 and provides an indirect connection between the chamber 18 and the suction unit 12, via the vents 32, the compartment 21 and the aperture 33.

Figure 2:
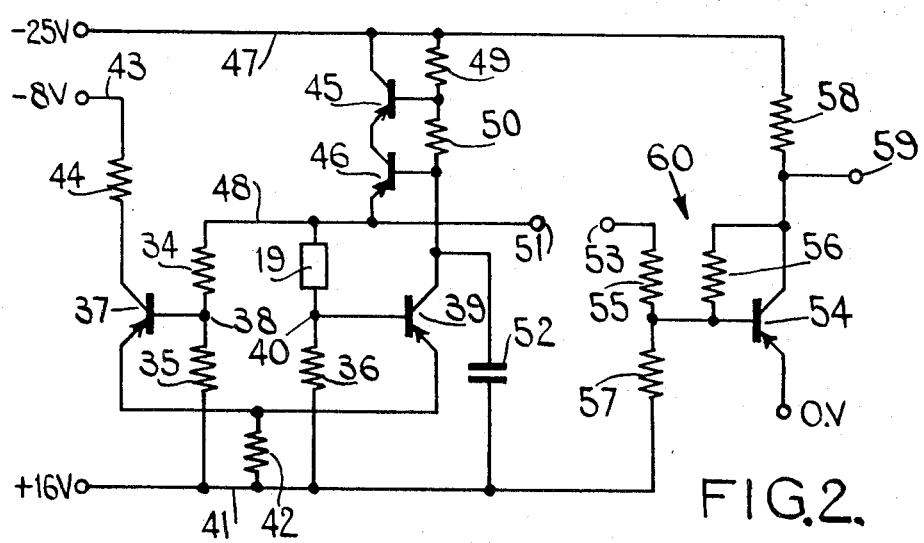
FIG. 2 is a circuit diagram of an electrical bridge arrangement in which a thermistor is incorporated a variable power supply for said bridge.

Referring now to FIG. 2 of the drawing, the thermistor 19 is connected into a resistance bridge circuit, the four limbs of which are composed of the thermistor 19 and resistors 34, 35 and 36, respectively. The base electrode of a transistor 37 is connected to junction 38 between the resistors 34 and 35, and the base electrode of another transistor 39 is connected to junction 40 between the thermistor 19 and the resistor 36, the emitter electrodes of the transistors 37 and 39 being connected to a positive supply line 41 (e.g. + 16 volts) via a common resistor 42, the transistors 37 and 39 thereby forming a "long-tailed" pair. The collector electrode of the transistor 37 is connected to a negative supply line 43 (e.g. − 8 volts) through a resistor 44.

Two transistors 45 and 46 are connected in series between another negative supply line 47 (e.g. − 25 volts) and a junction 48 between the thermistor 19 and the resistor 34. A bridge output terminal 51 is connected to the junction 48. The base electrodes are connected to different points on a potential divider composed of resistors 49 and 50 connected in series between the supply line 47 and the collector electrode of the transistor 39. A parasitic suppression capacitor 52 is connected between that collector electrode and the supply line 41.

Referring again to FIG. 1, the operation of the tape positioning apparatus of the compartment 20 alone will first be described, since this in itself forms a workable arrangement, the apparatus associated with compartment 21 being mainly a duplication of that associated with compartment 20.

If the tape loop 9 is in the position shown in FIG. 1, those apertures 15 which lie between the loop 9 and the open end of the reservoir 10 are open to the atmosphere. When the suction unit 12 is operated, air flow will occur through those apertures 15, into the channel 14, through the filter 17, past the thermistor 19, through the aperture 33, the compartment 21 and the vents 32 into the suction unit 12. The rate of air flow will be dependent upon the number of apertures 15 which are open to the atmosphere, and hence upon the position of the tape loop 9.

The air flow past the thermistor 19 affects the temperature and hence the resistance of the thermistor 19, so the resistance of the thermistor 19 varies for different rates of air flow and hence for different positions of the loop 9. Straightforward resistance measurements could therefore provide indications of loop position, but it is found that more rapid response of the thermistor 19 is obtained if, for every loop position, the resistance of the thermistor 19 is returned immediately to a constant value by varying a voltage applied to a bridge circuit including the thermistor 19, the magnitude of the applied voltage then providing the required indication of the loop position.

Referring also to FIG. 2, the thermistor 19 is cold when the apparatus is first switched on, and therefore has a high resistance. Transistor 37 is conductive, and the voltage drop across the resistor 42 holds the transistor 39 non-conductive. Current flows to the base electrodes of the transistors 45 and 46 through the resistors 49 and 50, causing the transistors 45 and 46 to conduct heavily. The voltage at the junction 48 approaches that at the supply line 47 so a large voltage (e.g. 38 volts) is applied across the thermistor 19 and the resistor 36 in series. Since the thermistor 19 has a high resistance, most of that voltage appears across the thermistor 19 and causes heating of the thermistor, thereby lowering its resistance. The junction 40 therefore becomes more negative and the transistor 39 starts to conduct. The base electrodes of the transistors 45 and 46 therefore become less negative and the transistors 45 and 46 become progressively less conductive. The voltage at the junction 48 (which is also the bridge output voltage at the terminal 51) becomes progressively less negative and transistor 37 becomes less conductive. A state of equilibrium is reached when the heating effect of the bridge voltage and the cooling effect of the air flow together produce a thermistor temperature such that the resistance of the thermistor 19 balances the bridge.

Any movement of the tape loop 9 results in a change in the rate of air flow past the thermistor 19, and a corresponding raising or lowering of the temperature and resistance of the thermistor 19. Such change in resistance is immediately counteracted by a change in the bridge output voltage, which restores the resistance of the thermistor 19 to the balancing value. The bridge output voltage therefore gives a measure of the tape loop position, and can be used to control operation of the motor 8 to increase or decrease the supply of tape to the reservoir 10 to restore the loop 9 to a predetermined position.

The sensing apparatus associated with compartment 21 (FIG. 1) operates in a similar manner, but in that case air flows through the vent 30, through the filter 29, past the thermistor 28, into the channel 24, through those apertures 25 which lie between the tape loop 9 and the vents 32, into the compartment 21, and through the vents 32 into the suction unit 12. Again, the air flow past the thermistor 28 varies in dependence upon the position of the tape loop 9 in the compartment 21.

The thermistor 28 is connected in another bridge circuit similar to that in which thermistor 19 is connected, but in this case the bridge output terminal is preferably connected to an input 53 of an inverter 60 which comprises a transistor 54 connected in a conventional feedback amplifier circuit with equal input and feedback resistors 55 and 56, respectively. A base biasing resistor 57 sets the operating point of the transistor 54. A collector load resistor 58 for the transistor 54 provides an inverted output at a terminal 59.

Where two compartments 20 and 21 are provided in the reservoir 10, the tape loop 9 is normally maintained just at the gap 22, so that it half-fills the reservoir 10. Shortening of the loop 9 causes a decrease in the air flow past the thermistor 19, whilst lengthening of the loop 9 causes a decrease in the air flow past the thermistor 28. If the bridge output from the bridge containing the thermistor 19 is now algebraically added to the inverted output from the bridge containing the thermistor 28, a signal indicating the error in tape position relative to the "half-full" state is obtained. Furthermore, effects of variations in ambient temperature and in suction tend to be minimised because the thermistors 19 and 28 are both affected similarly.

Variations in sizes and spacings of all or some of the apertures 15 and 25 may be made in order to vary the relationship between the loop position and the bridge output.

Although the invention has been described in relation to a complex magnetic tape handling machine, other embodiments of the invention could be used. For example, a much simpler form of machine having only a single compartment forming the reservoir 10 and having a thermistor circuit which merely uses changes in resistance of a thermistor to indicate the position of the tape loop, could embody the present invention. Furthermore, the invention is not confined to use in connection with tape loops, but may be used for sensing the position of any body which can be arranged to vary a flow of air or other fluid in dependence upon its position.

I claim:

1. A tape loop position indicating system for a tape handling apparatus including a duct; an open-ended reservoir for storing a loop of tape having a plurality of spaced apertures providing communication between the reservoir and the duct; a suction source connected to the reservoir; said tape loop operating as a barrier in the reservoir such that a varying number of the apertures are exposed to the atmosphere with the remainder of the apertures exposed to suction to produce a fluid flow in the duct which varies in response to the position of said tape loop in the reservoir; an electrical bridge; a thermistor forming one arm of the electrical bridge, said thermistor being located in said duct and responsive to fluid flow therein for generating a signal representative of the position of said tape loop; a power supply connected to said electrical bridge; means responsive to signals generated by the thermistor for varying the power supply input to the electrical bridge to maintain the resistance of the thermistor substantially constant regardless of variations of the fluid flow in the duct.

2. A system as claimed in claim 1 including a first group of the apertures located in a first part of the reservoir providing communication between the reservoir and a first duct; a second group of the apertures located in a second part of the reservoir and spaced from the first group of apertures providing communication between the reservoir and a second duct; the tape loop acting as a barrier in the reservoir such that a varying number of the apertures are exposed to atmosphere and the remainder are exposed to suction to produce a first fluid flow in the first duct and a second fluid flow in the second duct which vary in response to the position of the tape loop in the reservoir; first and second electrical bridges, a first thermistor forming one arm of the first electrical bridge, a second thermistor forming one arm of the second electrical bridge, said first and second thermistors respectively being located in the first and second ducts and responsive to the first and second fluid flows for generating signals representative of the position of the tape loop; first means responsive to signals generated by the first thermistor to supply power to the first electrical bridge such as to maintain the resistance of the first thermistor substantially constant regardless of variations in the first fluid flow; second means responsive to signals generated by the second thermistor to supply power to the second electrical bridge such as to maintain the resistance of the second thermistor substantially constant regardless of variations in the second fluid flow.

3. A system as claimed in claim 2 including means operative to connect the suction source to one end of the second duct, remote from the apertures.

4. A tape loop position indicating system for a tape handling apparatus including a duct; an open-ended reservoir for storing a loop of tape and having a plurality of spaced apertures providing communication between the reservoir and the duct; a suction source connected to the reservoir; said tape loop operating as a barrier in the reservoir such that a varying number of the apertures are exposed to the atmosphere with the remainder of the apertures connected to suction to produce a fluid flow in the duct which varies in response to the position of said tape loop in the reservoir and a thermistor responsive to variations in said fluid flow for generating a signal representative of the position of the tape loop.